US012411447B2

(12) United States Patent
Nakamura et al.

(10) Patent No.: US 12,411,447 B2
(45) Date of Patent: Sep. 9, 2025

(54) SHEET CONVEYANCE DEVICE AND IMAGE FORMING APPARATUS

(71) Applicant: BROTHER KOGYO KABUSHIKI KAISHA, Nagoya (JP)

(72) Inventors: Kazutoshi Nakamura, Kuwana (JP); Tomonori Watanabe, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 365 days.

(21) Appl. No.: 18/056,369

(22) Filed: Nov. 17, 2022

(65) Prior Publication Data

US 2023/0166927 A1 Jun. 1, 2023

(30) Foreign Application Priority Data

Nov. 26, 2021 (JP) ................................. 2021-192563

(51) Int. Cl.
*G03G 15/00* (2006.01)

(52) U.S. Cl.
CPC ..... *G03G 15/6529* (2013.01); *B65H 2403/48* (2013.01); *B65H 2403/50* (2013.01); *B65H 2403/72* (2013.01); *B65H 2601/11* (2013.01); *B65H 2601/325* (2013.01); *B65H 2801/27* (2013.01); *G03G 2221/1657* (2013.01)

(58) Field of Classification Search
CPC .............. B65H 3/0669; B65H 2403/72; B65H 2403/942; G03G 15/20–15/2098
See application file for complete search history.

(56) References Cited

U.S. PATENT DOCUMENTS

| | | | | |
|---|---|---|---|---|
| 9,223,269 | B2 * | 12/2015 | Suzuki | F16D 41/22 |
| 2008/0023903 | A1 | 1/2008 | Liu et al. | |
| 2015/0008638 | A1 | 1/2015 | Yamamoto | |
| 2015/0117918 | A1 | 4/2015 | Suzuki | |

FOREIGN PATENT DOCUMENTS

| | | | |
|---|---|---|---|
| JP | 3-148684 | A | 6/1991 |
| JP | 9-114287 | A | 5/1998 |
| JP | 3130032 | U | 2/2007 |
| JP | 2015-13740 | A | 1/2015 |
| JP | 2015-86939 | A | 5/2015 |
| JP | 2002-87611 | A | 3/2022 |

* cited by examiner

*Primary Examiner* — Jeremy R Severson
(74) *Attorney, Agent, or Firm* — Merchant & Gould P.C.

(57) ABSTRACT

A transmission gear is movable in an axial direction between a first position separated from an output gear and a second position coupled to the output gear in a state where the transmission gear engages with an input gear. The input gear is configured to: by rotating in a first direction by receiving driving force from a drive source, move the transmission gear from the first position to the second position and transmit driving force in the first direction to the output gear via the transmission gear; and by rotating in a second direction, move the transmission gear from the second position to the first position and cancel transmission of driving force to the output gear. The transmission gear is configured to, when the output gear rotates in a state where the transmission gear is located at the first position, not be coupled to the output gear.

18 Claims, 12 Drawing Sheets

SHEET CONVEYANCE DEVICE AND IMAGE FORMING APPARATUS

REFERENCE TO RELATED APPLICATIONS

This application claims priority from Japanese Patent Application No. 2021-192563 filed on Nov. 26, 2021. The entire content of the priority application is incorporated herein by reference.

BACKGROUND ART

A one-way clutch that transmits rotational force in only one direction is conventionally known. The one-way clutch is used, for example, in a sheet conveyance device provided in an image forming apparatus.

DESCRIPTION

In a sheet conveyance device, a one-way clutch is incorporated in a drive train that transmits drive power from a motor to a fuser (fixing device) that conveys a sheet and fixes an image on the sheet.

In such a fuser, a sheet jam may occur between fixing rollers. When a jam occurs, it is necessary to perform a jam removal process of pulling out the jammed sheet by hand. At this time, if the fixing roller and the motor are connected to each other during the jam removal process, the load of the motor and the drive train is applied to rotation of the fixing roller, which may hinder a smooth jam removal process.

In order to deal with the above problem, it is conceivable to provide a driving force transmission release mechanism in addition to a one-way clutch, in driving force transmission means for transmitting driving force from a drive source to the fixing roller. The driving force transmission release mechanism performs transmission and release of driving force between the fixing roller and the drive source, thereby releasing coupling between the fixing roller and the drive source during a jam removal process. However, if such a driving force transmission release means is provided, the configuration of the driving force transmission means may become complicated.

In view of the foregoing, an example of an object of this disclosure is to provide a sheet conveyance device and an image forming apparatus configured to enable a smooth jam removal process without providing a complicated mechanism in a driving force transmission means.

According to one aspect, this specification discloses a sheet conveyance device. The sheet conveyance device includes a drive source, a roller configured to convey a sheet, and a one-way clutch configured to transmit a driving force from the drive source to the roller. The one-way clutch includes a fixed shaft, an input gear, an output gear, and a transmission gear. The fixed shaft extends in an axial direction. The input gear is rotatably supported by the fixed shaft. The input gear is rotatable by receiving the driving force from the drive source. The output gear is rotatably supported by the fixed shaft. The output gear is coupled to the roller and configured to transmit the driving force to the roller. The transmission gear is supported by the fixed shaft. The transmission gear is movable in the axial direction between a first position and a second position in a state where the transmission gear engages with the input gear. The first position is a position at which the transmission gear is separated from the output gear. The second position is a position at which the transmission gear is coupled to the output gear. The input gear is configured to: by rotating in a first direction by receiving the driving force from the drive source, move the transmission gear from the first position to the second position and transmit the driving force in the first direction to the output gear via the transmission gear; and by rotating in a second direction opposite the first direction by receiving the driving force from the drive source, move the transmission gear from the second position to the first position and cancel transmission of the driving force to the output gear. The transmission gear is configured to, when the output gear rotates in a state where the transmission gear is located at the first position, not be coupled to the output gear.

According to another aspect, this specification also discloses an image forming apparatus including a print engine and the above-described sheet conveyance device.

According to the above-described configuration, when the output gear rotates in a state where the transmission gear is located at the first position, the transmission gear is not coupled to the output gear. Because the transmission gear and the output gear are not coupled, the roller is easily rotated when performing a jam removal process of removing a jammed sheet without providing a complicated mechanism in driving force transmission means for transmitting the driving force from the drive source to the roller. Thus, the jam removal process is performed smoothly.

Next, a mode for carrying out the present disclosure will be described with reference to the accompanying drawings.

[Image Forming Apparatus]

Figure 1:
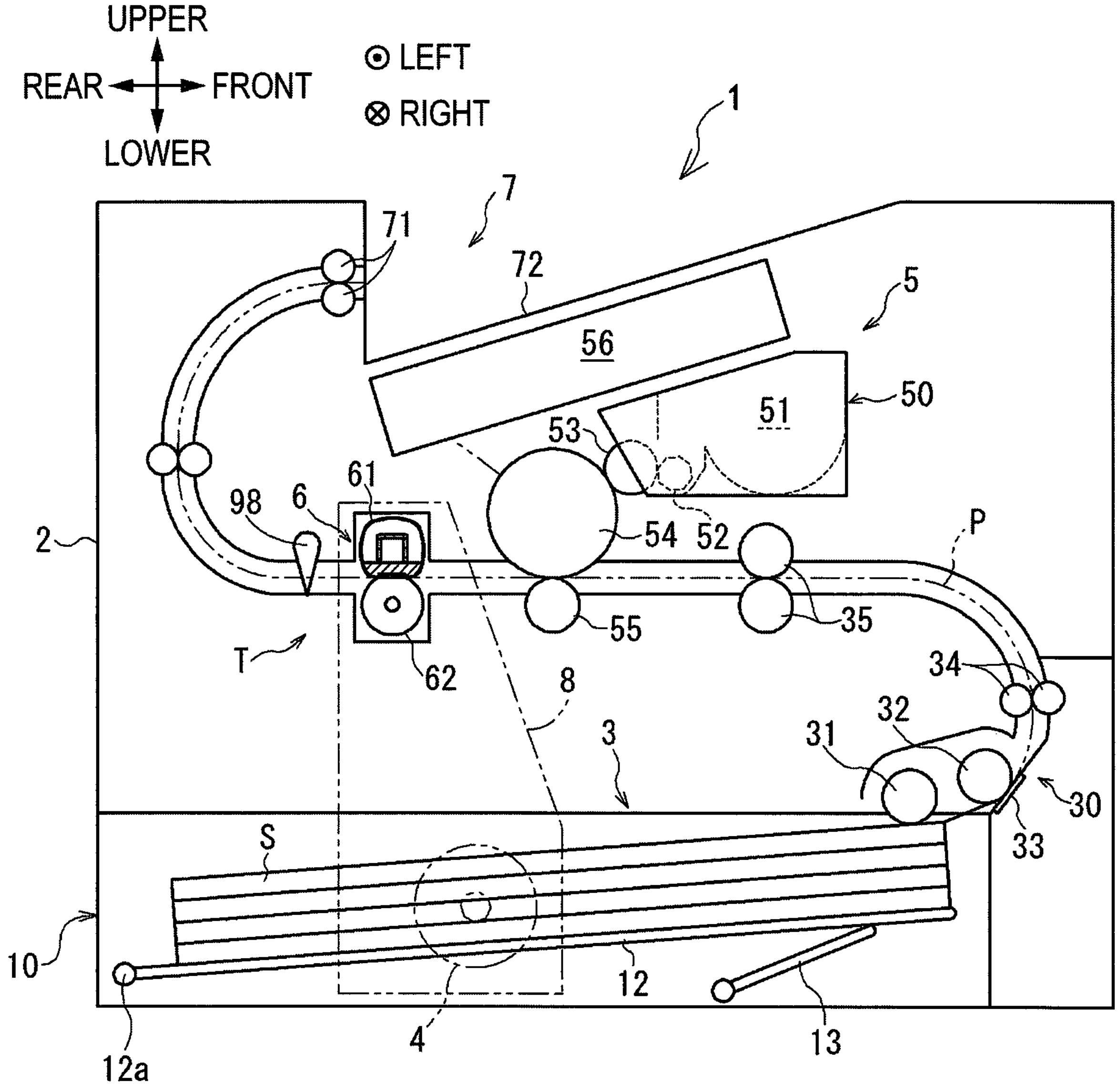
FIG. 1 is a central cross-sectional view showing an image forming apparatus.

An image forming apparatus 1 according to an embodiment shown in FIG. 1 is provided with a sheet conveyance device. For example, the image forming apparatus 1 is a laser printer that forms an image on a sheet S by an electrophotographic method.

In the following description, the right side in FIG. 1 is defined as the front side of the image forming apparatus 1, the left side in FIG. 1 is defined as the rear side of the image forming apparatus 1, the near side in the direction perpendicular to the drawing sheet of FIG. 1 is defined as the left side of the image forming apparatus 1, and the far side in the direction perpendicular to the drawing sheet of FIG. 1 is defined as the right side of the image forming apparatus 1. Further, the upper side and the lower side in FIG. 1 are defined as the upper side and the lower side of the image forming apparatus 1, respectively.

The image forming apparatus 1 includes an apparatus main body 2, a sheet feeder 3, a print engine (image forming section) 5, a fuser (fixing device) 6, a sheet discharge section 7, and a sheet conveyance device T.

The apparatus main body 2 accommodates the sheet feeder 3, the print engine 5, the fuser 6, the sheet discharge section 7, and the sheet conveyance device T.

The sheet feeder 3 includes a sheet feed tray 10 that supports the sheet S, a sheet conveyor 30, a conveyance roller pair 34, and a registration roller pair 35. The sheet feeder 3 is arranged in the lower part of the apparatus main body 2 and conveys the sheet S supported by the sheet feed tray 10 to the print engine 5. The image forming apparatus 1 has a conveyance path P for the sheet S from the sheet feeder 3 to the sheet discharge section 7 via the print engine 5.

The sheet feed tray 10 has a pressure plate 12 and a pressing plate 13. The pressure plate 12 is a plate member that supports the sheet S from below. The pressure plate 12 is rotatable about a pivot point 12*a* at the rear end thereof, and is movable up and down between a lowered position and a raised position by pivoting about the pivot point 12*a*. The pressing plate 13 is located below the pressure plate 12, and causes the pressure plate 12 to move up and down between the lowered position and the raised position.

The sheet conveyor 30 is a conveyance mechanism that separates and picks up the sheets S supported by the sheet feed tray 10 one sheet at a time and conveys the sheet S toward the print engine 5. The sheet conveyor 30 includes a sheet feed roller 31, a separation roller 32, and a separation pad 33.

The sheet feed roller 31 is a roller for sending the sheet S supported by the sheet feed tray 10 toward the separation roller 32. The separation roller 32 is arranged downstream of the sheet feed roller 31 in a sheet conveyance direction. The separation pad 33 is arranged to face the separation roller 32 and is urged toward the separation roller 32.

The sheets S sent out toward the separation roller 32 by the sheet feed roller 31 are separated to one sheet between the separation roller 32 and the separation pad 33. The sheet S separated to one sheet is sent to a conveyance path P.

The sheet S sent to the conveyance path P is conveyed toward the print engine 5 by the conveyance roller pair 34 and the registration roller pair 35. The registration roller pair 35 regulates the movement of the leading edge of the conveyed sheet S to temporarily stop the sheet S, and then conveys the sheet S toward the print engine 5 at a particular timing.

The print engine 5 is arranged downstream of the sheet feeder 3 in the sheet conveyance direction, and forms an image on the sheet S conveyed from the sheet feeder 3. The print engine 5 includes a process cartridge 50 that transfers an image onto the surface of the sheet S conveyed from the sheet feeder 3 and an exposure unit 56 that exposes the surface of a photosensitive drum 54 in the process cartridge 50.

The process cartridge 50 is arranged above the sheet feeder 3 in the apparatus main body 2, and includes a developer storage chamber 51, a supply roller 52, a development roller 53, the photosensitive drum 54, a transfer roller 55, and so on.

The exposure unit 56 includes a laser diode, a polygon mirror, a lens, a reflecting mirror, and so on. The exposure unit 56 irradiates the photosensitive drum 54 with laser light based on image data inputted to the image forming apparatus 1, thereby exposing the surface of the photosensitive drum 54.

The developer storage chamber 51 stores toner serving as a developer. The toner stored in the developer storage chamber 51 is sent to the supply roller 52 while being stirred by an agitator (not shown). The supply roller 52 further supplies the toner sent from the developer storage chamber 51 to the development roller 53.

The development roller 53 is arranged in close contact with the supply roller 52, and bears toner supplied from the supply roller 52 and positively charged by a sliding contact member (not shown). A developing bias is applied to the development roller 53 by bias applying means (not shown).

The photosensitive drum 54 is arranged adjacent to the development roller 53. The surface of the photosensitive drum 54 is uniformly charged by a charger (not shown) and then exposed by the exposure unit 56. The exposed portion of the photosensitive drum 54 has a lower potential than the other portions, and an electrostatic latent image is formed on the photosensitive drum 54 based on the image data. Then, positively charged toner is supplied from the development roller 53 to the surface of the photosensitive drum 54 on which the electrostatic latent image is formed, whereby the electrostatic latent image is visualized to form a toner image.

The transfer roller 55 is arranged to face the photosensitive drum 54. A transfer bias is applied to the transfer roller 55 by bias application means (not shown). When the sheet S is nipped and conveyed between the transfer roller 55 and the photosensitive drum 54 on which the toner image is formed in a state where the transfer bias is applied to the surface of the transfer roller 55, the toner image formed on the surface of the photosensitive drum 54 is transferred to the surface of the sheet S. The sheet S on which the toner image has been transferred is conveyed to the fuser 6.

The fuser 6 has a heating unit 61 and a pressure roller 62, and fixes the image transferred to the sheet S by the process cartridge 50. The heating unit 61 is heated by being supplied with power from a power source (not shown). The pressure roller 62 is arranged to face the heating unit 61. One of the heating unit 61 and the pressure roller 62 is urged against the other by an urging mechanism (not shown), and the heating unit 61 and the pressure roller 62 are in close contact with each other.

When the sheet S on which the toner image has been transferred is conveyed to the fuser 6, the fuser 6 conveys and heats the sheet S while nipping the sheet S between the heating unit 61 and the pressure roller 62, thereby fixing the toner image on the sheet S. In this way, the fuser 6 conveys and heats the sheet S sent from the print engine 5.

The sheet discharging section 7 is located downstream of the print engine 5 in the sheet conveyance direction, and discharges the sheet S on which an image has been formed by the print engine 5 to the outside of the image forming apparatus 1. The sheet discharge section 7 includes a sheet discharge roller pair 71 and a sheet discharge tray 72. The sheet discharge roller pair 71 is configured to discharge the sheet S conveyed along the conveyance path P from the fuser 6 toward the outside of the apparatus main body 2. The sheet discharge tray 72 is formed on the upper surface of the apparatus main body 2, and supports the sheet S discharged to the outside of the apparatus main body 2 by the sheet discharge roller pair 71.

[Fuser]

Figure 2:
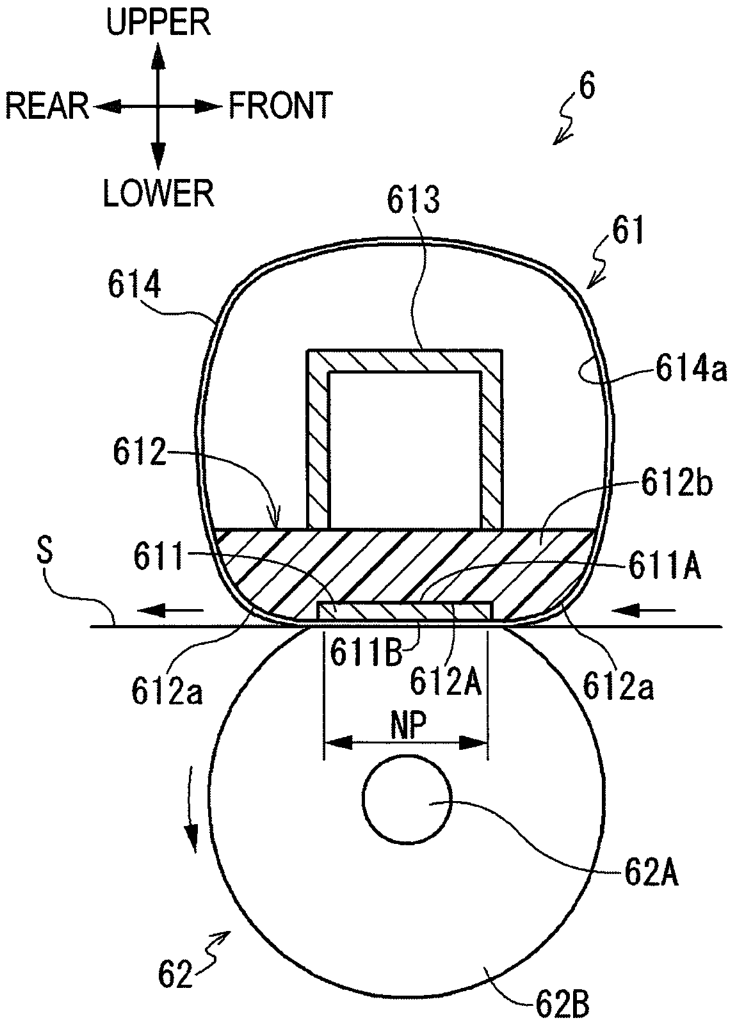
FIG. 2 is a side cross-sectional view showing a fuser.
Figure 3:
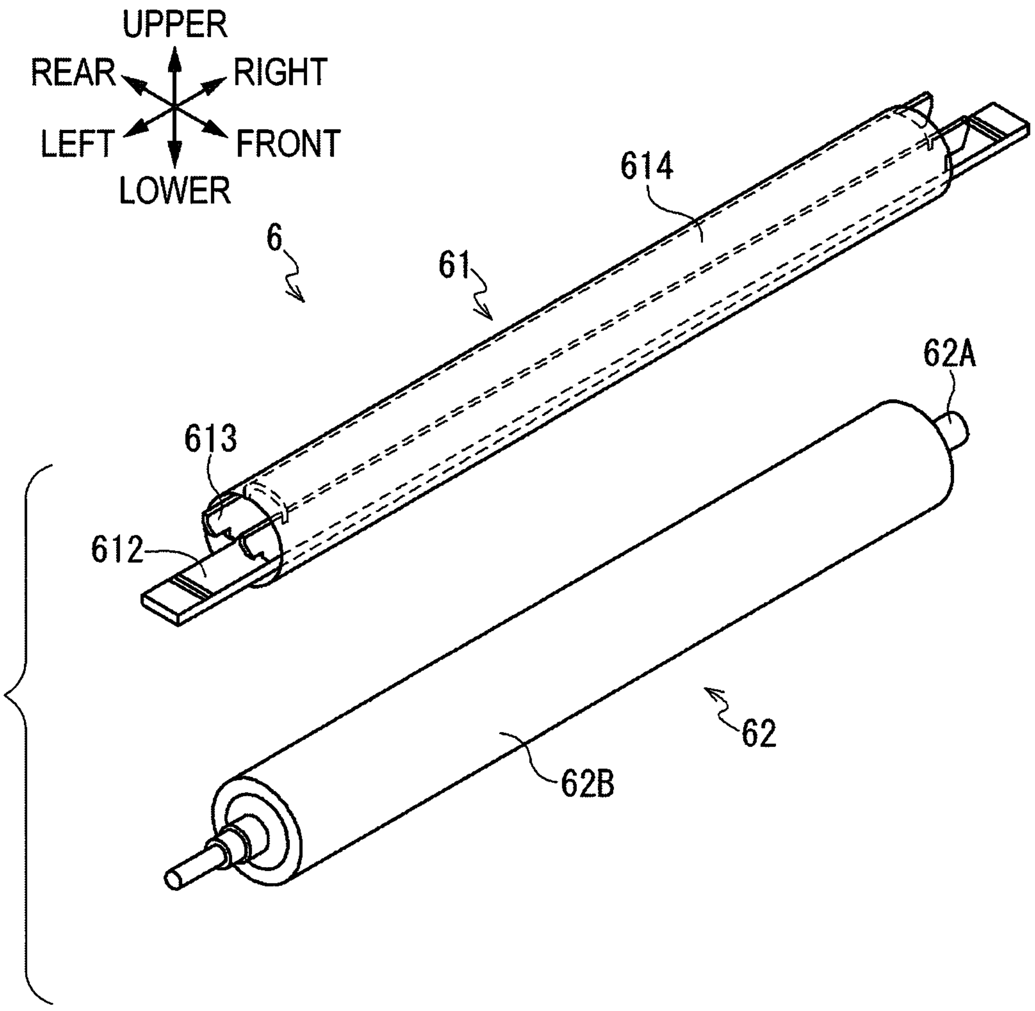
FIG. 3 is a perspective view showing a heating unit and a pressure roller of the fuser.

As shown in FIGS. 2 and 3, the heating unit 61 of the fuser 6 includes a heater 611, a holder 612, a stay 613, and a belt 614. The heater 611 is a flat plate-shaped heater extending in the left-right direction. The heater 611 has a first surface 611A and a second surface 611B opposite to the first surface 611A. The first surface 611A is supported by the holder 612.

The holder 612 is made of, for example, a resin member, and has a guide surface 612*a* and a support wall 612*b*. The guide surface 612 is in contact with an inner peripheral surface 614*a* of the belt 614 and guides the belt 614. The support wall 612*b* has a support surface 612A that supports the heater 611. The support surface 612A of the support wall 612*b* is in contact with the first surface 611A of the heater 611. The stay 613 is a member that supports the holder 612. The stay 613 is formed by bending a plate material having greater rigidity than the holder 612, such as a steel plate, into a substantially U-shaped cross section.

The belt 614 is an endless belt having heat resistance and flexibility. The belt 614 has a metal tube made of metal such as stainless steel, and a fluororesin layer covering the metal tube. The heater 611, the holder 612, and the stay 613 are arranged inside the belt 614. The belt 614 is configured to rotate around the heater 611, the holder 612, and the stay 613. An inner peripheral surface 614*a* of the belt 614 is in contact with the heater 611.

The pressure roller 62 has a metal shaft 62A and an elastic layer 62B covering the shaft 62A. The pressure roller 62 is pressed against the heater 611 via the belt 614. The pressure roller 62 forms a nip portion NP for heating and pressing the sheet S by sandwiching the belt 614 with the heater 611. That is, the pressure roller 62 heats and presses the sheet S together with the heater 611 at the nip portion NP.

The pressure roller 62 is configured to be rotationally driven by transmission of driving force from a motor 4 provided in the image forming apparatus 1. Rotationally driving the pressure roller 62 causes the belt 614 to rotate followingly due to the frictional force between the pressure roller 62 and the belt 614 or the sheet S sandwiched at the nip portion NP. In this way, the sheet S on which a toner image has been transferred is conveyed between the pressure roller 62 and the heated belt 614, and the toner image is thermally fixed. The pressure roller 62 is an example of a roller that conveys a sheet.

[Sheet Conveyance Device]

The sheet conveyance device T includes the motor 4, a driving force transmission train 8, the pressure roller 62, and so on, and conveys the sheet S. The motor 4 is an example of a drive source.

[Driving Force Transmission Train]

Figure 4:
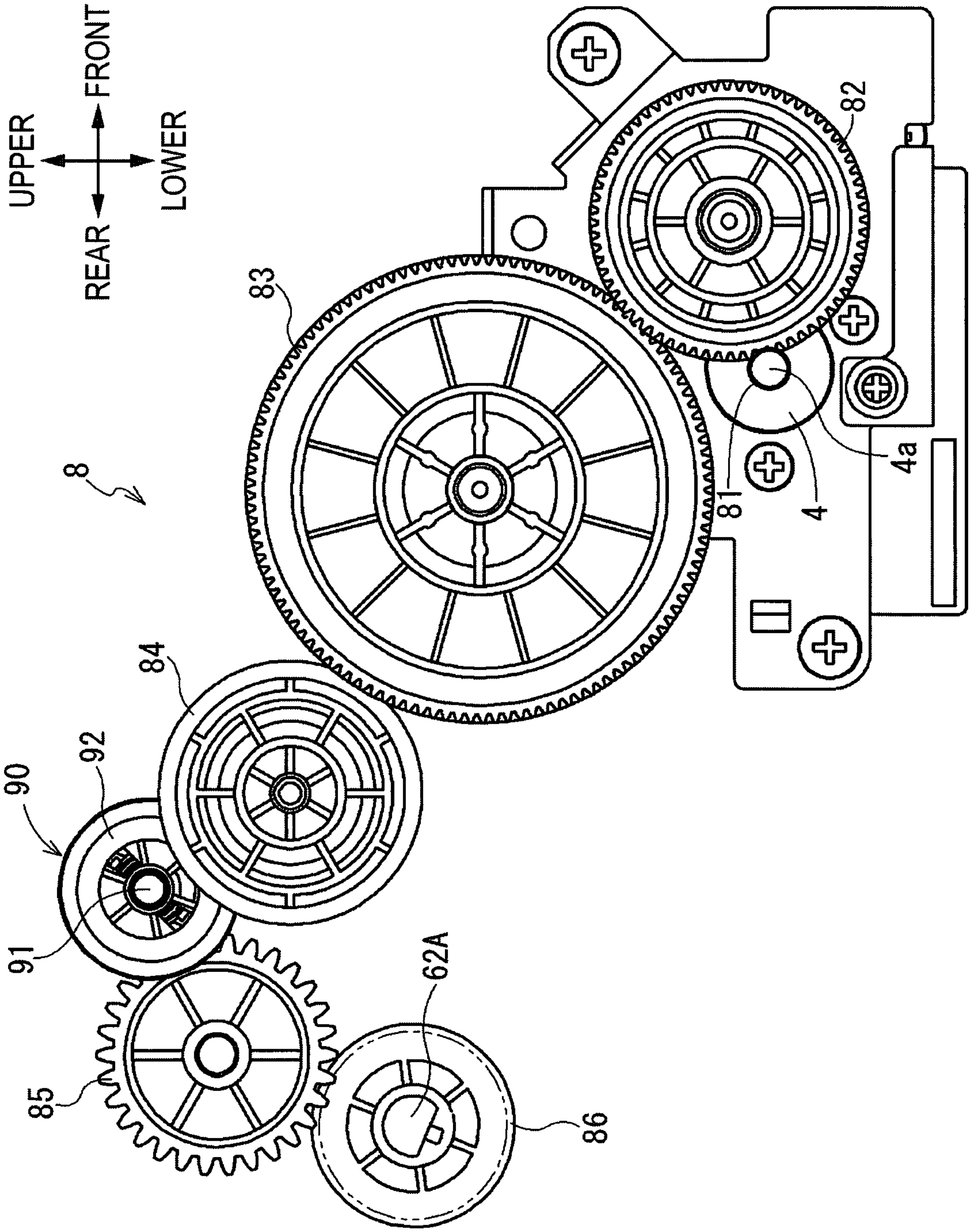
FIG. 4 is a side view showing a driving force transmission train.

As shown in FIG. 4, the driving force transmission train 8 is a driving force transmission train for transmitting the driving force from the motor 4 to the pressure roller 62 of the fuser 6. The driving force transmission train 8 is arranged at the left end of the apparatus main body 2. The driving force transmission train 8 includes a motor gear 81, a first idle gear 82, a second idle gear 83, a third idle gear 84, a one-way clutch 90, a fourth idle gear 85, and a pressure roller gear 86.

The motor gear 81 is fixed to an output shaft 4*a* of the motor 4, and the first idle gear 82 engages with the motor gear 81. The second idle gear 83 engages with the first idle gear 82, and the third idle gear 84 engages with the second idle gear 83. The input side of the one-way clutch 90 is connected to the third idle gear 84. The fourth idle gear 85 is connected to the output side of the one-way clutch 90. The pressure roller gear 86 engages with the fourth idle gear 85. The pressure roller gear 86 is fixed to the shaft 62A of the pressure roller 62 so as to be integrally rotatable.

[One-Way Clutch]

Figure 5:
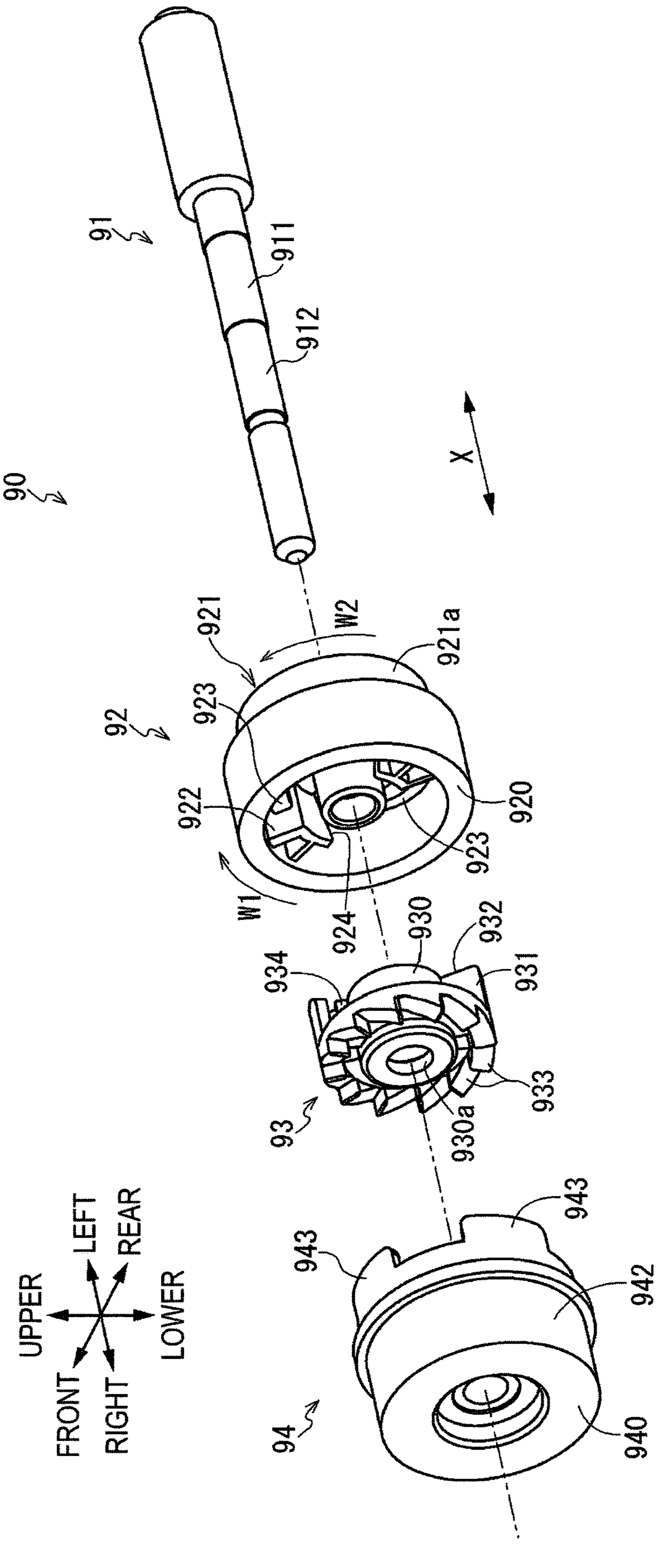
FIG. 5 is an exploded perspective view showing a one-way clutch.
Figure 6A:
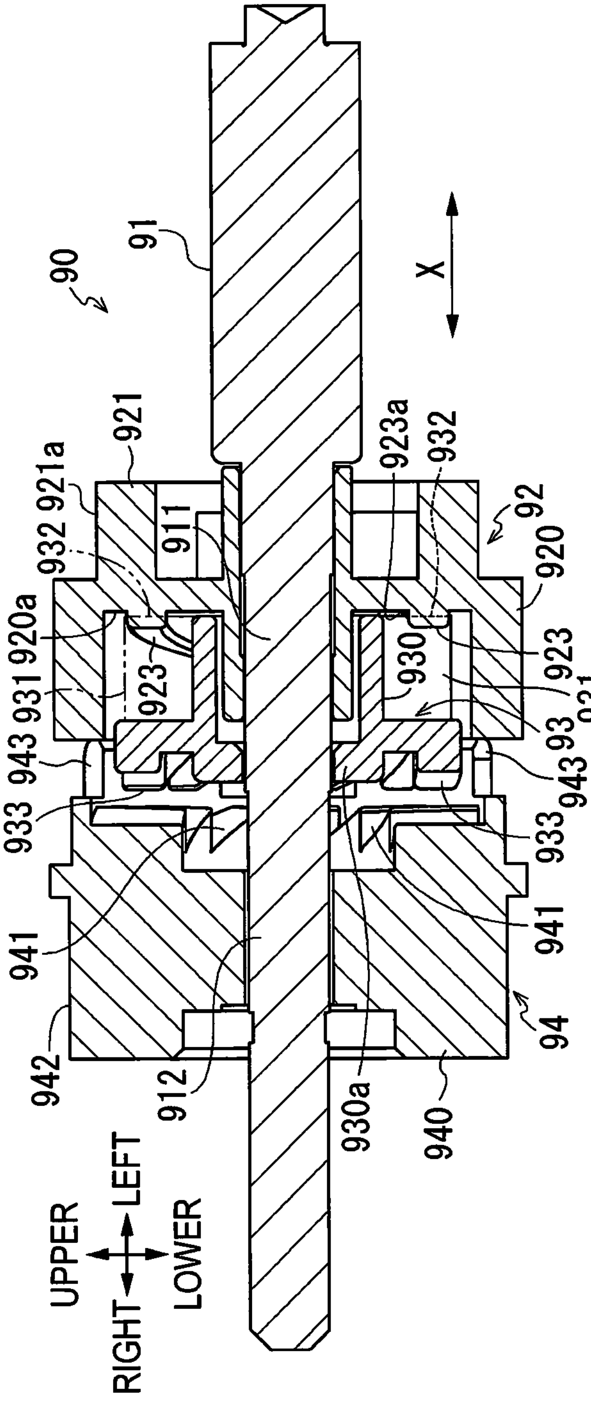
FIG. 6A is a side cross-sectional view showing the one-way clutch in a state where a transmission gear is located at a first position.
Figure 6B:
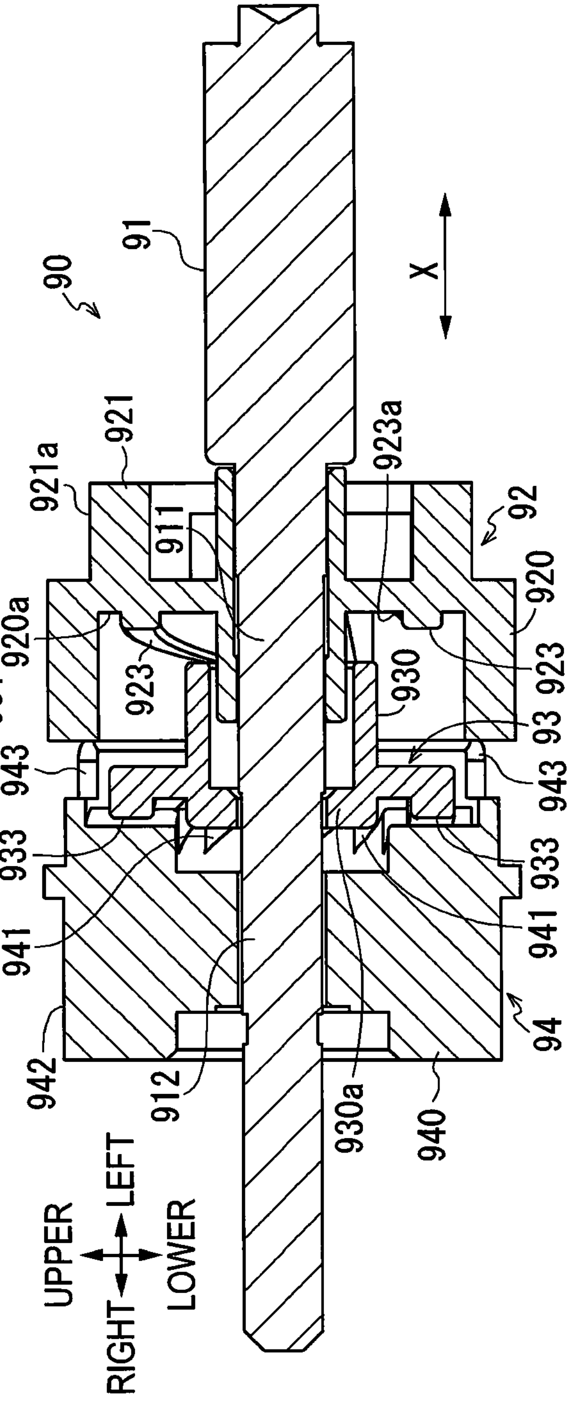
FIG. 6B is a side cross-sectional view showing the one-way clutch in a state where the transmission gear is located at a second position.

As shown in FIGS. 5, 6A and 6B, the one-way clutch 90 is configured to transmit the driving force from the motor 4 to the pressure roller 62. The one-way clutch 90 includes a fixed shaft 91, an input gear 92, a transmission gear 93, and an output gear 94. The input gear 92 is the input-side gear of the one-way clutch 90, and the output gear 94 is the output-side gear of the one-way clutch 90.

In the one-way clutch 90, the input gear 92, the transmission gear 93, and the output gear 94 are arranged in this order from left to right. That is, the transmission gear 93 is located between the input gear 92 and the output gear 94 in an axial direction X.

Figure 7:
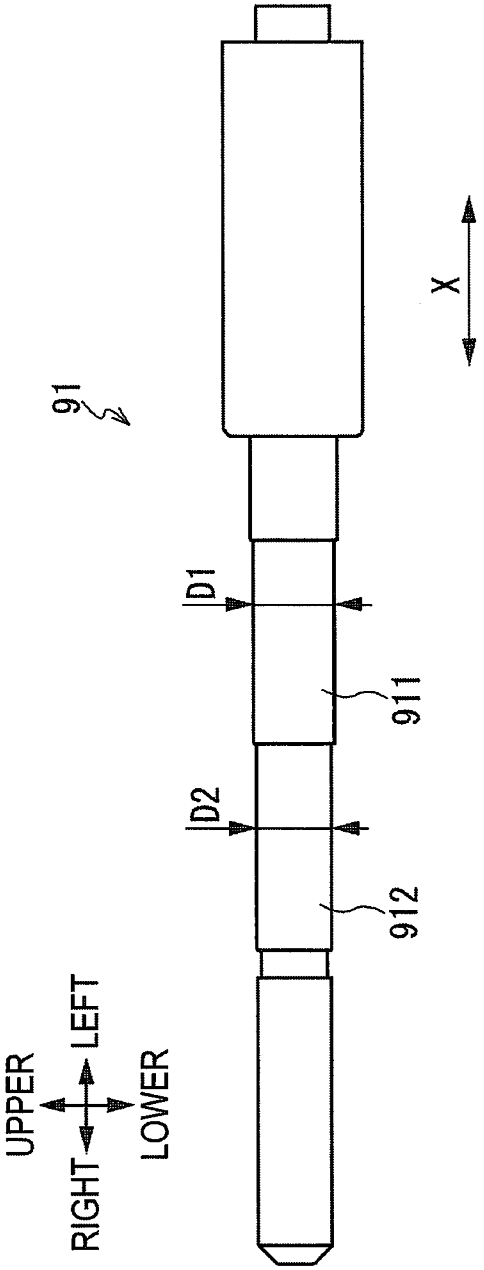
FIG. 7 is a rear view showing a fixed shaft of the one-way clutch.
Figure 8A:
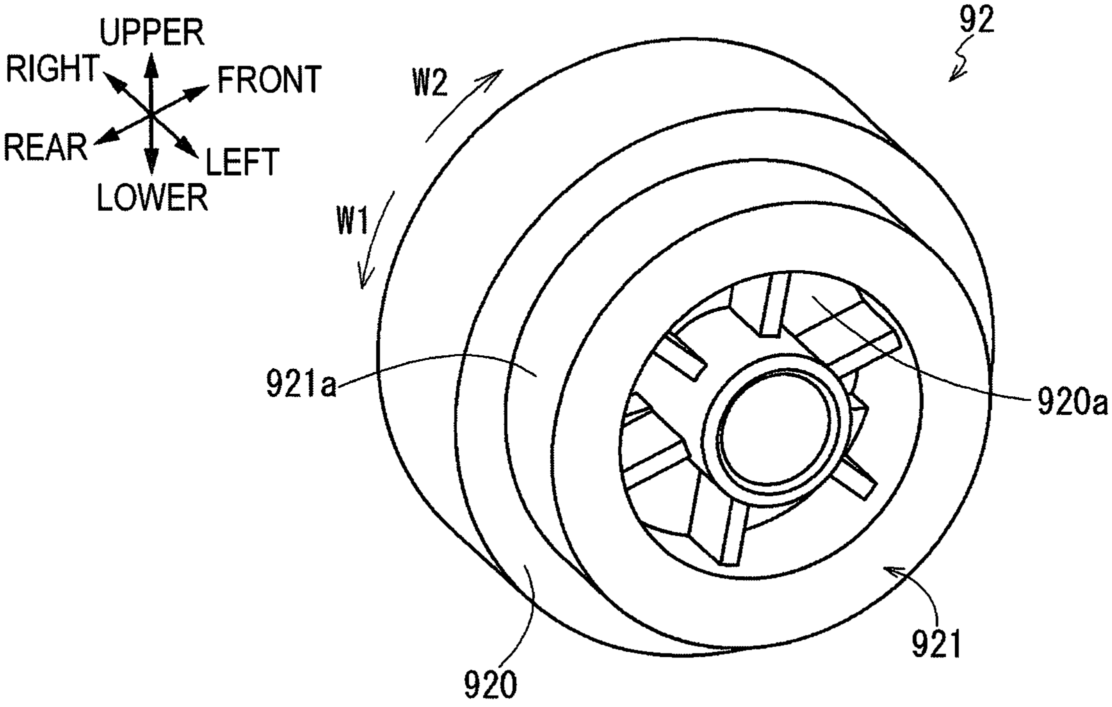
FIGS. 8A and 8B are perspective views showing an input gear of the one-way clutch.
Figure 8B:
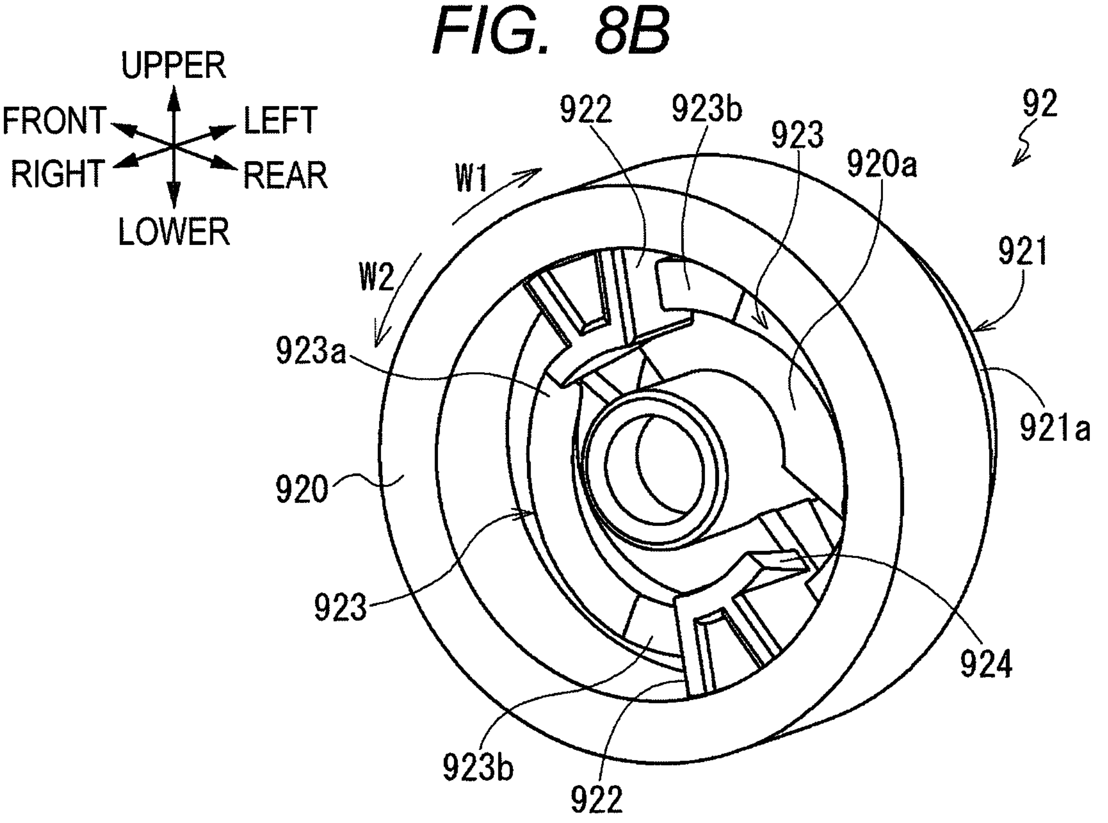

As shown in FIGS. 5 to 7, the fixed shaft 91 is a long shaft member extending in the left-right direction, and has a first shaft portion 911 and a second shaft portion 912. The direction along the left-right direction in which the fixed shaft 91 extends is the axial direction X of the fixed shaft 91. The first shaft portion 911 has a first outer diameter D1, and the second shaft portion 912 has a second outer diameter D2 smaller than the first outer diameter D1 (D1>D2). The second shaft portion 912 is formed continuously to the right of the first shaft portion 911.

As shown in FIGS. 5, 6A, 6B, and 8, the input gear 92 is rotatably supported by the first shaft portion 911 of the fixed shaft 91 and is rotatable by receiving the driving force from the motor 4. The input gear 92 is rotatable in a first direction W1 and a second direction W2 opposite to the first direction W1. The input gear 92 has a body 920, an input tooth portion 921, a transmission portion 922 (transmission protrusion), an inclined cam surface 923, and an inclined engagement surface 924.

The body 920 is formed of a cylindrical member having a bottom portion 920*a*, and the bottom portion 920*a* is located at the left end of the body 920. The input tooth portion 921 is formed in a cylindrical shape protruding leftward from the bottom portion 920*a* of the body 920, and input teeth 921*a* are formed on the outer peripheral surface of the input tooth portion 921. The input teeth 921*a* engage with the third idle gear 84. A driving force from the motor 4 is inputted to the input teeth 921*a* via the motor gear 81, the first idle gear 82, the second idle gear 83, and the third idle gear 84.

The transmission portion 922 is a protrusion (protruding piece) that protrudes radially inward from the inner peripheral surface of the body 920, and is configured to engage with the transmission gear 93. In this embodiment, the transmission portions 922 are formed at two positions. The two transmission portions 922 are located at such positions that the distance from one transmission portion 922 to the other transmission portion 922 in a circumferential direction is equal to the distance from the other transmission portion 922 to the one transmission portion 922 in the circumferential direction.

The inclined cam surface 923 is an inclined surface formed on the bottom portion 920*a* of the body 920 and facing the output gear 94 side in the axial direction X. Here, a phrase "the inclined cam surface 923 is an inclined surface facing the output gear 94 side" means that the inclined cam surface 923 is an inclined surface that is visible when viewed from the output gear 94 side in the axial direction X, that is, from the right side.

The inclined cam surface 923 extends along the circumferential direction. The inclined cam surface 923 is inclined relative to the direction perpendicular to the axial direction X such that the upstream side of the inclined cam surface 923 in the first direction W1 is closer to the output gear 94 in the axial direction X than the downstream side. The inclined cam surface 923 has a downstream end 923*a* in the first direction W1 and an upstream end 923*b* in the first direction W1. In the axial direction X, the upstream end 923*b* is located closer to the output gear 94 than the downstream end 923*a* is.

Figure 9:
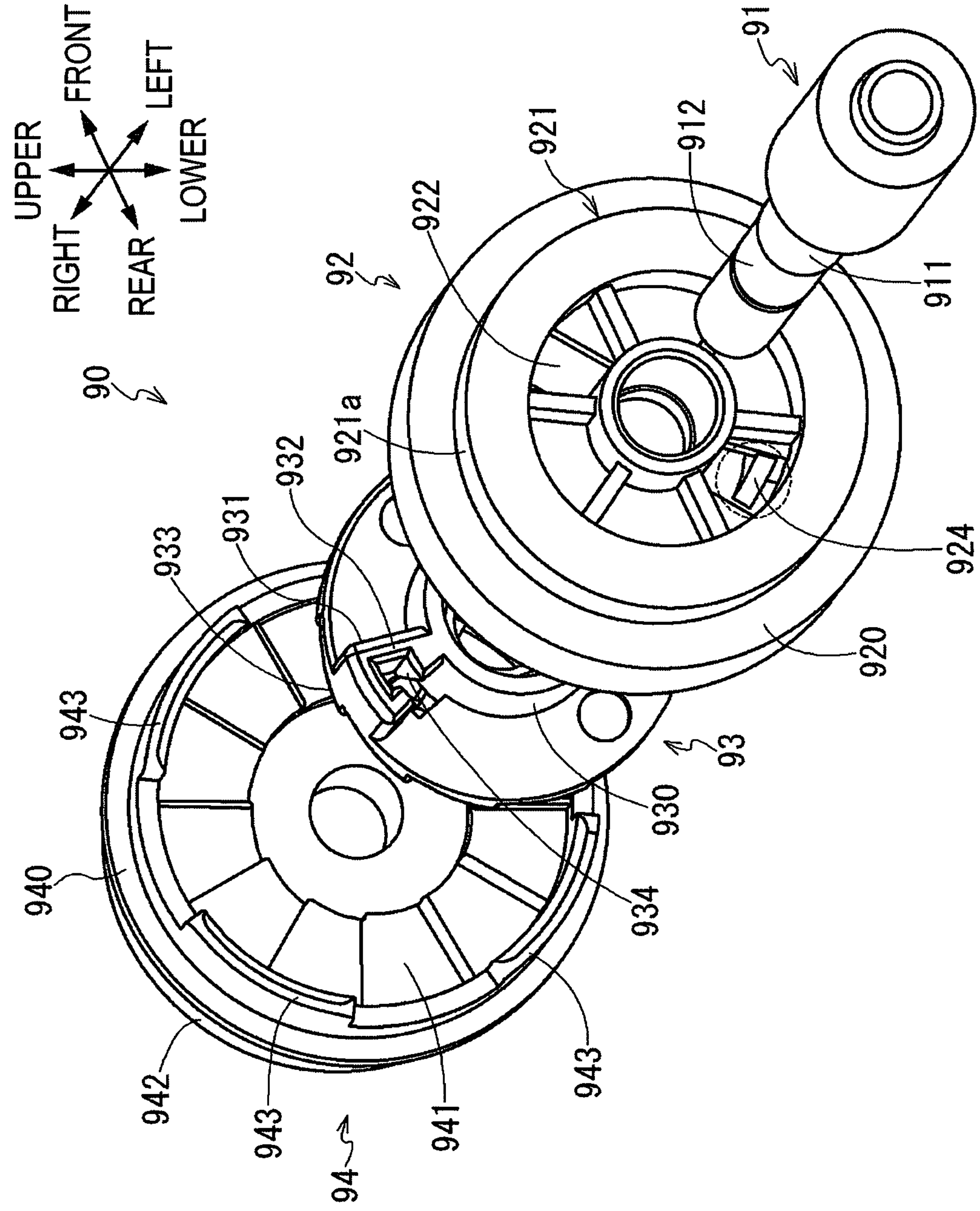
FIG. 9 is an exploded perspective view of the one-way clutch in which an inclined engagement surface of the input gear is visibly shown.
Figure 10A:
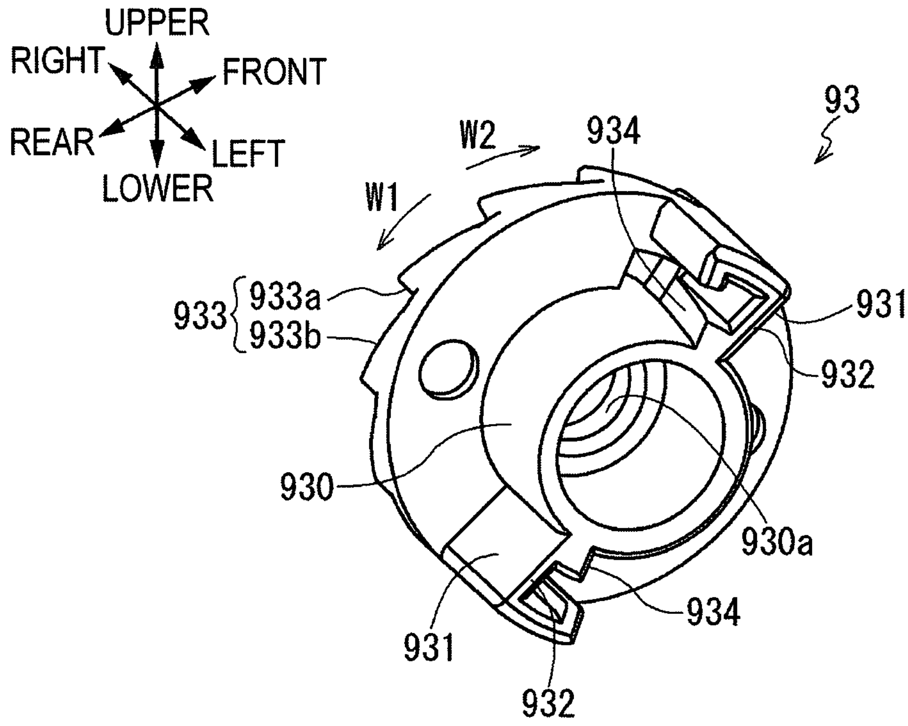
FIGS. 10A and 10B are perspective views showing a transmission gear of the one-way clutch.
Figure 10B:
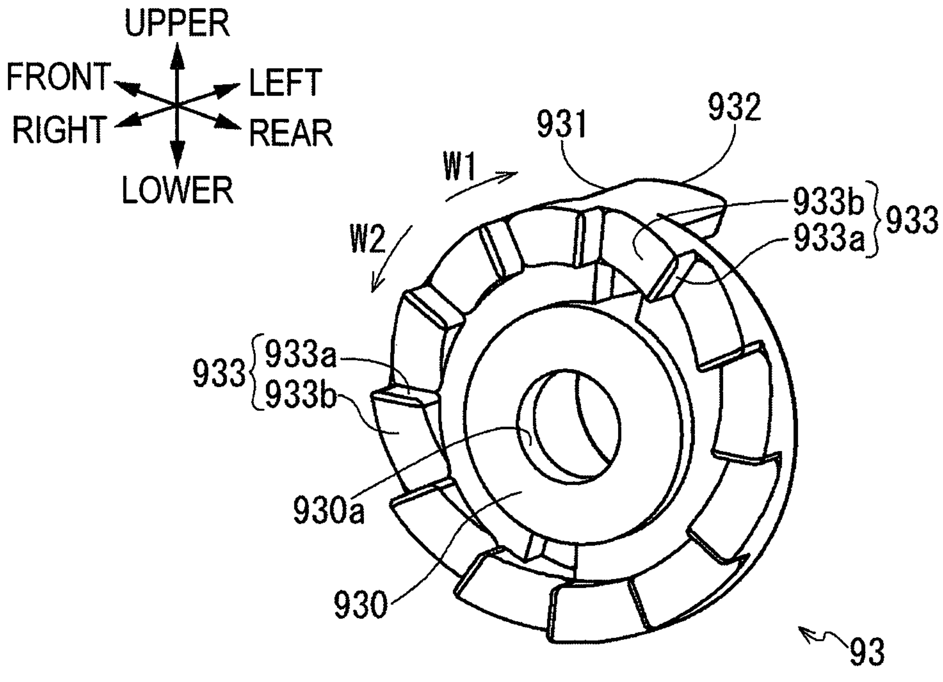
Figure 11A:
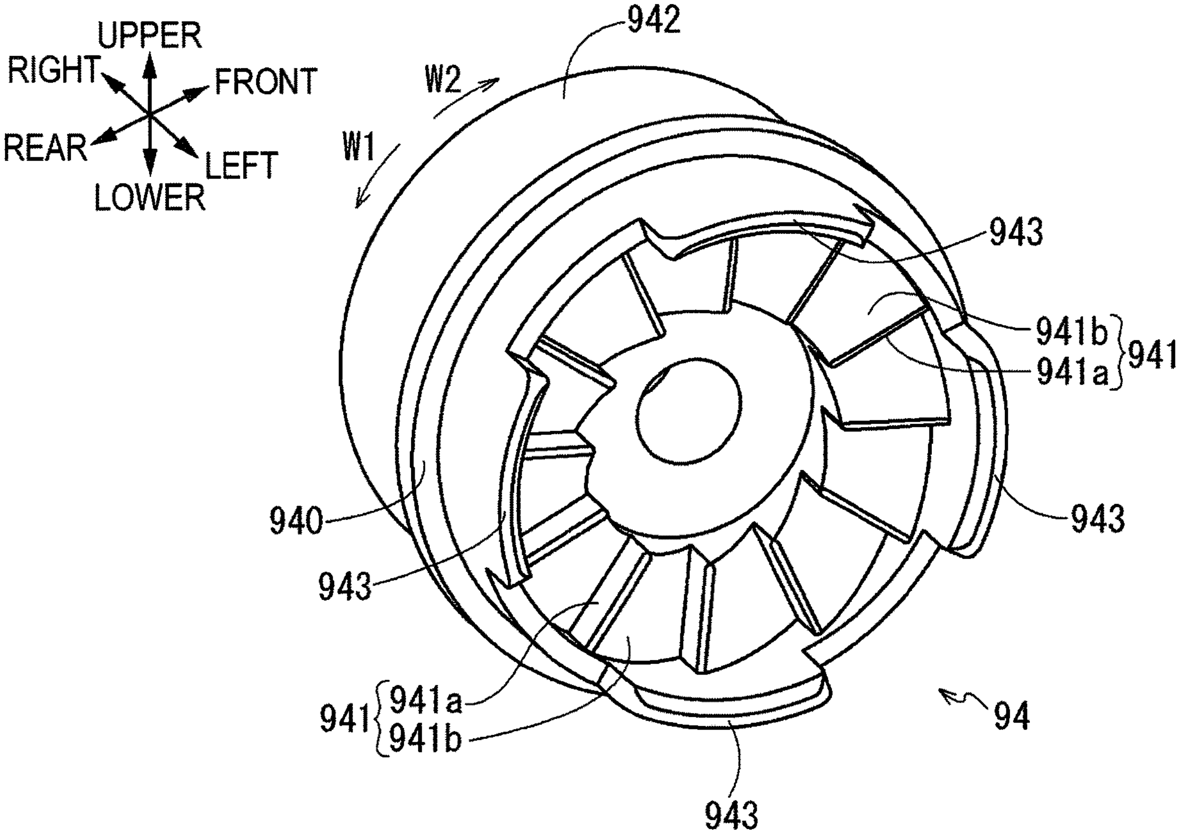
FIGS. 11A and 11B are perspective views showing an output gear of the one-way clutch.
Figure 11B:
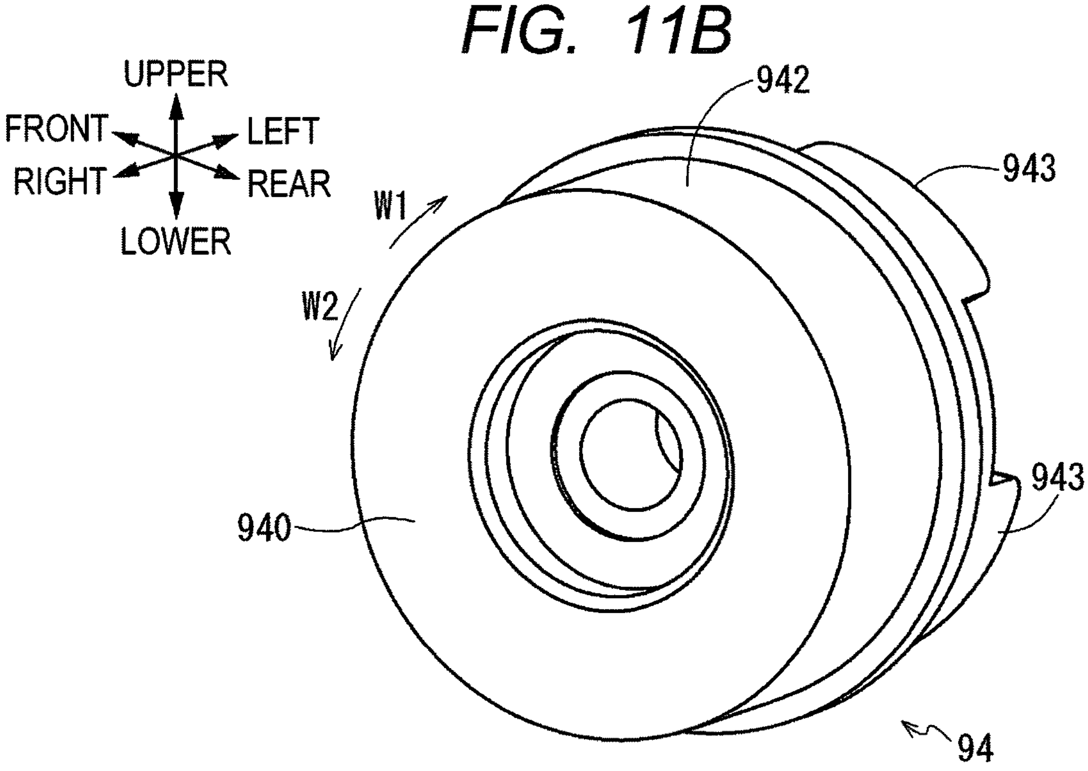

The inclined engagement surface 924 is formed inside the body 920, and located upstream of the transmission portion 922 in the first direction W1. The inclined engagement surface 924 is an inclined surface facing away from the output gear 94 in the axial direction X. As shown in FIG. 9, a phrase "the inclined engagement surface 924 is an inclined surface facing away from the output gear 94" means that the inclined engagement surface 924 is an inclined surface that is visible when viewed from the opposite side of the output gear 94 in the axial direction X, that is, from the left side (see the inclined engagement surface 924 surrounded by a dotted line in FIG. 9). Note that in FIG. 9, the bottom portion 920*a* of the input gear 92 is shown to be transparent such that the inclined engagement surface 924 is visible.

The inclined engagement surface 924 extends along the circumferential direction. The inclined engagement surface 924 is inclined relative to the direction perpendicular to the axial direction X such that the downstream side of the inclined engagement surface 924 in the second direction W2 is closer to the output gear 94 in the axial direction X than the upstream side. In this embodiment, the inclined engagement surfaces 924 are formed at two positions. The two inclined engagement surfaces 924 are arranged at such positions that the distance from one inclined engagement surface 924 to the other inclined engagement surface 924 in a circumferential direction is equal to the distance from the other inclined engagement surface 924 to the one inclined engagement surface 924 in the circumferential direction.

As shown in FIGS. 5, 6A, 6B, 10A and 10B, the transmission gear 93 is supported by the fixed shaft 91 so as to be movable in the axial direction X. The transmission gear 93 is rotatable in the first direction W1 and the second direction W2. The transmission gear 93 has a cylindrical portion 930, a transmitted portion 931 (transmitted protrusion), a contact surface 932, a ratchet pawl 933, and an engagement pawl 934.

The cylindrical portion 930 is formed in a cylindrical shape. The cylindrical portion 930 has a small diameter portion 930*a* at the end on the output gear 94 side in the axial direction X, the diameter of which is smaller than that of other portions. The transmitted portion 931 is a protrusion (protruding piece) that protrudes radially outward from the outer peripheral surface of the cylindrical portion 930.

In this embodiment, the transmitted portions 931 are formed at two positions. The two transmitted portions 931 are arranged at such positions that the distance from one transmitted portion 931 to the other transmitted portion 931 in a circumferential direction is equal to the distance from the other transmitted portion 931 to the one transmitted portion 931 in the circumferential direction. The transmitted portion 931 is configured to engage with the transmission portion 922 of the input gear 92 when the input gear 92 rotates in the first direction W1.

The contact surface 932 is located at an end of the transmitted portion 931 facing the input gear 92 side in the axial direction X. The contact surface 932 is configured to contact the inclined cam surface 923 of the input gear 92 when the input gear 92 rotates in the first direction W1.

The ratchet pawl 933 protrudes toward the output gear 94 side from an end of the cylindrical portion 930 at the output gear 94 side in the axial direction X. The ratchet pawl 933 has an engagement surface 933*a* and a sliding surface 933*b* formed continuously with the engagement surface 933*a* in the circumferential direction. A plurality of ratchet pawls 933 are formed along the circumferential direction, and the engagement surfaces 933*a* and the sliding surfaces 933*b* are alternately arranged in the circumferential direction.

The engagement pawl 934 protrudes from the transmitted portion 931 toward the downstream side in the first direction W1 in the circumferential direction. In this embodiment, the engagement pawls 934 are formed at two positions. The two engagement pawls 934 are arranged at such positions that the distance from one engagement pawl 934 to the other engagement pawl 934 in a circumferential direction is equal to the distance from the other engagement pawl 934 to the one engagement pawl 934 in the circumferential direction. The engagement pawl 934 is configured to engage with the inclined engagement surface 924 of the input gear 92 when the input gear 92 rotates in the second direction W2.

In a state where the transmission gear 93 is engaged with the input gear 92, the transmission gear 93 is movable in the axial direction X between a first position where the small diameter portion 930*a* of the cylindrical portion 930 is supported by the first shaft portion 911 of the fixed shaft 91 (the position shown in FIG. 6A) and a second position where the small diameter portion 930*a* of the cylindrical portion 930 is supported by the second shaft portion 912 of the fixed shaft 91 (the position shown in FIG. 6B).

The small diameter portion 930*a* of the transmission gear 93 located at the first position is supported by the first shaft portion 911 with a first sliding resistance between the small diameter portion 930*a* and the first shaft portion 911. The small diameter portion 930*a* of the transmission gear 93 located at the second position is supported by the second shaft portion 912 with a second sliding resistance between the small diameter portion 930*a* and the second shaft portion 912. The second sliding resistance is smaller than the first sliding resistance.

In other words, the first shaft portion 911 of the fixed shaft 91 supports the transmission gear 93 located at the first position in a state where the first sliding resistance of a particular magnitude acts between the fixed shaft 91 and the transmission gear 93. The second shaft portion 912 of the fixed shaft 91 supports the transmission gear 93 located at the second position in a state where the second sliding resistance smaller than the first sliding resistance acts between the fixed shaft 91 and the transmission gear 93.

As shown in FIGS. 5, 6A, 6B, 11A and 11B, the output gear 94 is rotatably supported by the second shaft portion 912 of the fixed shaft 91. The output gear 94 is connected to the pressure roller 62 of the fuser 6, and transmits the driving force from the motor 4 to the pressure roller 62. The output gear 94 is rotatable in the first direction W1 and the second direction W2. The output gear 94 has a body 940, ratchet recesses 941, output teeth 942, and spacers 943.

The body 940 is formed in a cylindrical shape. The ratchet recess 941 is located at an end of the body 940 facing the input gear 92 in the axial direction X. The ratchet recess 941 is configured to engage with the ratchet pawl 933 of the transmission gear 93. Specifically, the ratchet recess 941 engages with the ratchet pawl 933 when the transmission gear 93 rotates in the first direction W1 relative to the output gear 94, and does not engage with the ratchet pawl 933 when the transmission gear 93 rotates in the second direction W2 relative to the output gear 94.

The ratchet recess 941 has an engagement surface 941*a* and a sliding surface 941*b* formed continuously with the engagement surface 941*a* in the circumferential direction. A plurality of ratchet recesses 941 are formed along the circumferential direction, and the engagement surfaces 941*a* and the sliding surfaces 941*b* are alternately arranged in the circumferential direction.

The ratchet recess 941 is separated from the ratchet pawl 933 of the transmission gear 93 in the axial direction X when the transmission gear 93 is at the first position. The ratchet recess 941 is coupled to the ratchet pawl 933 of the transmission gear 93 in the axial direction X when the transmission gear 93 is at the second position.

When the transmission gear 93 rotates in the first direction W1 relative to the output gear 94 in a state where the transmission gear 93 is at the second position, the engagement surface 933*a* of the ratchet pawl 933 and the engagement surface 941*a* of the ratchet recess 941 are engaged and the transmission gear 93 and the output gear 94 rotate together.

When the transmission gear 93 rotates in the second direction W2 relative to the output gear 94 in a state where the transmission gear 93 is at the second position, the sliding surface 933*b* of the ratchet pawl 933 slides relative to the sliding surface 941*b* of the ratchet recess 941 in the circumferential direction, and the engagement surface 933*a* and the engagement surface 941*a* are disengaged. In this case, even if the transmission gear 93 rotates in the second direction W2, the output gear 94 does not rotate.

When the transmission gear 93 is at the first position, the ratchet recess 941 and the ratchet pawl 933 are separated from each other. Thus, the output gear 94 neither rotates when the transmission gear 93 rotates in the first direction W1 nor when the transmission gear 93 rotates in the second direction W2. When the output gear 94 rotates in a state where the transmission gear 93 is at the first position, the transmission gear 93 is not coupled to the output gear 94.

The output teeth 942 are formed on the outer peripheral surface of the body 940 and engages with the fourth idle gear 85. The output teeth 942 are coupled to the pressure roller 62 of the fuser 6 via the fourth idle gear 85 and pressure roller gear 86. The output teeth 942 transmit the driving force from the motor 4 to the pressure roller 62 via the fourth idle gear 85 and pressure roller gear 86.

The spacer 943 protrudes toward the input gear 92 from an end of the body 940 facing the input gear 92 side in the axial direction X, and is in contact with the input gear 92. A plurality of spacers 943 are formed at intervals along the circumferential direction at the outer peripheral edge of the body 940.

The spacer 943 regulates the position of the output gear 94 relative to the input gear 92 in the axial direction X by contacting the input gear 92. By regulating the position of the output gear 94 relative to the input gear 92 with the spacer 943, the transmission gear 93 is movable in the axial direction X between the input gear 92 and the output gear 94.

[Operation of One-Way Clutch]

Next, the operation of the one-way clutch 90 will be described.

In the one-way clutch 90 shown in FIG. 6A, the transmission gear 93 is located at the first position, and the contact surface 932 of the transmission gear 93 is in contact with the downstream end 923*a* of the inclined cam surface 923 of the input gear 92. The transmission gear 93 located at the first position is separated from the output gear 94 in the axial direction X.

In a state where the transmission gear 93 is located at the first position in this way, even if the output gear 94 rotates in the first direction W1 or the second direction W2, the output gear 94 and the transmission gear 93 are not coupled to each other. Thus, in a state where the transmission gear 93 is located at the first position, even if the pressure roller 62 coupled to the output gear 94 rotates, the pressure roller 62 is not coupled to the motor 4 which is coupled to the input gear 92.

When the transmission gear 93 is located at the first position, the small diameter portion 930*a* of the cylindrical portion 930 of the transmission gear 93 is supported by the first shaft portion 911 of the fixed shaft 91 in a state where the first sliding resistance acts therebetween.

When the input gear 92 receives the driving force from the motor 4 and rotates in the first direction W1 in the state shown in FIG. 6A, the inclined cam surface 923 in contact with the contact surface 932 of the transmission gear 93 moves in the circumferential direction, and the transmission gear 93 receives force in the circumferential direction from the inclined cam surface 923 due to a sliding resistance between the transmission gear 93 and the inclined cam surface 923.

The transmission gear 93 is supported by the first shaft portion 911 in a state where the first sliding resistance acts between the small diameter portion 930*a* and the first shaft portion 911. The first sliding resistance is set to be greater than the sliding resistance in the circumferential direction generated between the transmission gear 93 and the inclined cam surface 923. Thus, when the input gear 92 rotates in the first direction W1 in a state where the contact surface 932 of the transmission gear 93 and the inclined cam surface 923 are in contact with each other, the transmission gear 93 keeps a state where rotation relative to the fixed shaft 91 is suppressed, and thus does not rotate at the same speed together with the input gear 92.

As a result, the phase of the transmission gear 93 relative to the inclined cam surface 923 in the first direction W1 is shifted, and the position of the inclined cam surface 923 contacting the contact surface 932 of the transmission gear 93 is shifted from the downstream end 923*a* to the upstream side in the first direction W1. The upstream side of the inclined cam surface 923 in the first direction W1 is located closer to the output gear 94 than the downstream side of the inclined cam surface 923 is. Thus, when the position of the inclined cam surface 923 contacting the contact surface 932 of the transmission gear 93 moves to the upstream side in the first direction W1, the transmission gear 93 is pressed by the inclined cam surface 923 toward the output gear 94 in the axial direction X and moves.

As shown in FIG. 6B, when the position of the inclined cam surface 923 contacting the contact surface 932 of the transmission gear 93 reaches the upstream end 923*b*, the transmission gear 93 moves to the second position.

In this way, when the input gear 92 rotates in the first direction W1, the first sliding resistance between the small diameter portion 930*a* and the first shaft portion 911 prevents the transmission gear 93 located at the first position from rotating at the same speed together with the input gear 92, and thus enables the transmission gear 93 to move from the first position to the second position.

After the transmission gear 93 has moved to the second position, the transmission portion 922 of the input gear 92 rotating in the first direction W1 contacts the transmitted portion 931 of the transmission gear 93. When the transmission portion 922 contacts the transmitted portion 931, a force in the first direction W1 acts on the transmission gear 93 from the input gear 92, and the input gear 92 and the transmission gear 93 rotate together in the first direction W1.

The second sliding resistance between the second shaft portion 912 and the small diameter portion 930*a* of the transmission gear 93 located at the second position is smaller than the first sliding resistance. Thus, the transmission gear 93 rotates smoothly against the second sliding resistance.

In the one-way clutch 90, the first outer diameter D1 of the first shaft portion 911 for supporting the transmission gear 93 located at the first position is different from the second outer diameter D2 of the second shaft portion 912 for supporting the transmission gear 93 located at the second position. This causes the magnitude of the first sliding resistance and the magnitude of the second sliding resistance be different from each other, thereby simplifying the configuration of the one-way clutch 90.

When the transmission gear 93 is located at the second position and rotates in the first direction W1, the engagement surface 933*a* of the ratchet pawl 933 of the transmission gear 93 engages with the engagement surface 941*a* of the ratchet recess 941 of the output gear 94, and the transmission gear 93 and the output gear 94 rotate integrally in the first direction W1.

In this way, the input gear 92 receives the driving force from the motor 4 and rotates in the first direction W1, thereby moving the transmission gear 93 from the first position to the second position, so that the transmission gear 93 is coupled to the output gear 94 and the driving force in the first direction W1 from the motor 4 is transmitted to the output gear 94 via the transmission gear 93.

In other words, when the input gear 92 rotates in the first direction W1, the transmission gear 93 located at the second position and coupled to the output gear 94 rotates relative to the fixed shaft 91 together with the input gear 92 against the second sliding resistance. This enables the driving force to be transmitted from the transmission gear 93 to the output gear 94.

In the one-way clutch 90, when the input gear 92 rotates in the first direction W1, the transmission gear 93 is pressed toward the output gear 94 by the inclined cam surface 923 and moves from the first position to the second position. This enables switching from a state where the transmission of the driving force to the output gear 94 is canceled to a state where the driving force is transmitted to the output gear 94 via the transmission gear 93 with a simple configuration.

Conversely, in the one-way clutch 90, when the input gear 92 receives the driving force from the motor 4 and rotates in the second direction W2 from the state where the transmission gear 93 is located at the second position shown in FIG. 6B, the transmission gear 93 is moved from the second position to the first position so as to cancel transmission of the driving force to the output gear 94.

Specifically, when the input gear 92 receives the driving force from the motor 4 and rotates in the second direction W2 in a state where the transmission gear 93 is at the second position, the inclined engagement surface 924 of the input gear 92 engages with the engagement pawl 934 of the transmission gear 93. The downstream side of the inclined engagement surface 924 in the second direction W2 is located closer to the output gear 94 than the upstream side of the inclined engagement surface 924 in the second direction W2. Thus, when the engagement pawl 934 engages with the inclined engagement surface 924 and is pressed in the second direction W2, the position of the inclined engagement surface 924 contacting the engagement pawl 934 moves upstream in the second direction W2, and the transmission gear 93 is pulled toward the input gear 92 in the axial direction X by the inclined engagement surface 924.

In other words, when the transmission gear 93 is located at the second position and the input gear 92 rotates in the second direction W2, the transmission gear 93 is pulled toward the input gear 92 in the axial direction X by the inclined engagement surface 924 and moves to the first position. As a result, the transmission gear 93 and the output gear 94 are separated from each other, and transmission of the driving force from the input gear 92 to the output gear 94 is cancelled.

As described above, in the one-way clutch 90, by rotating the input gear 92 in the second direction, the inclined engagement surface 924 and the engagement pawl 934 are engaged, and the transmission gear 93 is moved from the second position to the first position.

In the one-way clutch 90, when the transmission gear 93 is at the first position, the transmission gear 93 and the output gear 94 are separated without being coupled. Thus, even when the output gear 94 is rotated, the transmission gear 93 does not rotate together with the output gear 94 and the output gear 94 idles.

Thus, the load of the motor 4 and the gear train between the motor 4 and the input gear 92 is not applied to the output gear 94 coupled to the pressure roller 62. This enables the pressure roller 62 to be easily rotated when removing a jammed sheet S, without providing a complicated mechanism such as a driving force transmission canceling mechanism in addition to the one-way clutch 90 in the driving force transmission train 8. Thus, removing the jammed sheet S is performed smoothly.

When the transmission gear 93 is at the first position, the one-way clutch 90 cuts off the transmission of the driving force from the motor 4 to the pressure roller 62. Thus, even if the pressure roller 62 is rotated when removing a jammed sheet, the load of the motor 4 is not applied to the pressure roller 62, and a process of removing a jammed sheet is performed smoothly.

Since the one-way clutch 90 is coupled to the pressure roller 62 of the fuser 6, the sheet S is smoothly removed from the fuser 6 when a jam of the sheet S occurs in the fuser 6.

The heating unit 61 of the fuser 6 has the heater 611 of a flat plate shape, and the pressure roller 62 is pressed against the heater 611. Thus, the rotational torque of the pressure roller 62 tends to be larger than a case where the heating unit 61 is formed by a roller member. However, in the one-way clutch 90, by moving the transmission gear 93 to the first position where the transmission gear 93 and the output gear 94 are separated from each other, the load applied to the pressure roller 62 does not increase and a jammed sheet is removed smoothly.

[Motor Drive Control When a Jam Occurs]

Figure 12:
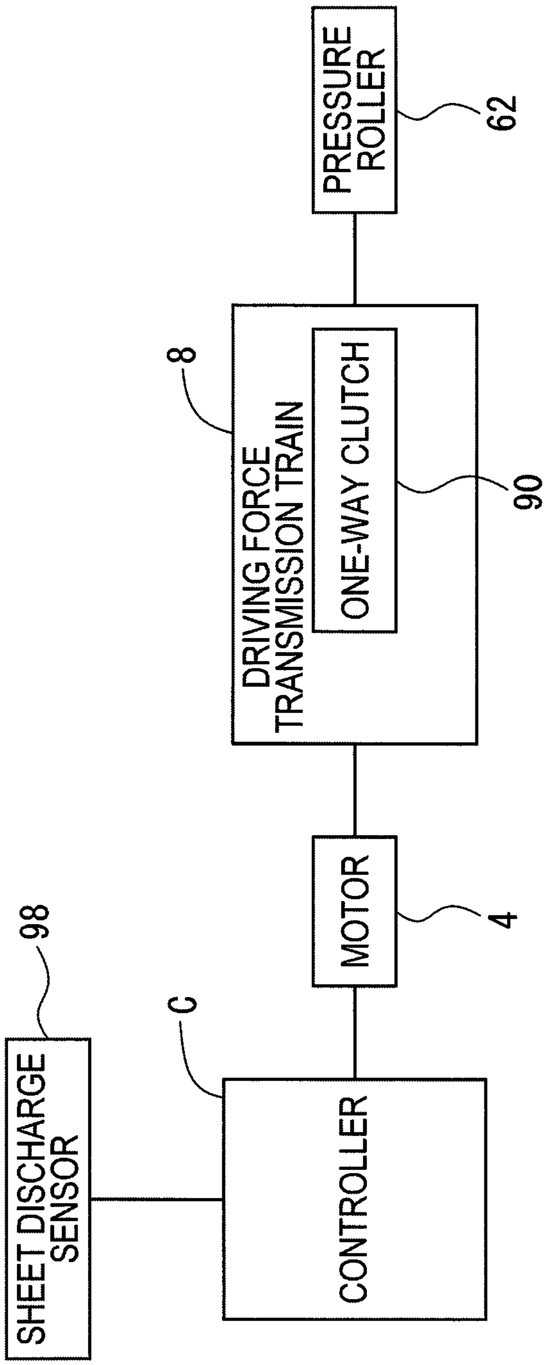
FIG. 12 is a block diagram showing a controller to which a motor and a sheet discharge sensor are connected.

As shown in FIG. 12, the image forming apparatus 1 includes a controller C and the sheet discharge sensor 98. The controller C is connected to the motor 4 and configured to control the operation of the motor 4. As shown in FIG. 1, the sheet discharge sensor 98 is arranged between the fuser 6 and the sheet discharge roller pair 71 in the sheet conveyance direction, and is configured to detect the sheet S that passes through the fuser 6.

The controller C is configured to, when the detection of the sheet S by the sheet discharge sensor 98 continues for a particular time or longer, for example, determine that the sheet S is jammed in the fuser 6. In response to determining that the sheet S is jammed, the controller C controls the motor 4 to rotate in the direction in which the input gear 92 rotates in the second direction W2.

When the motor 4 is driven to rotate the input gear 92 in the second direction W2, the inclined engagement surface 924 engages with the engagement pawl 934, the transmission gear 93 moves to the first position, and the transmission gear 93 separates from the output gear 94.

In this way, when the sheet S is jammed, the motor 4 is driven under the control of the controller C to rotate the input gear 92 in the second direction W2, thereby moving the transmission gear 93 from the second position to the first position so that the transmission gear 93 and the output gear 94 are separated from each other. Thus, when the pressure roller 62 is rotated for removing a jam, the load of the motor 4 is not applied to the pressure roller 62, and the jam is removed smoothly.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below:

For example, in response to determining that a sheet S is jammed at a position other than the fuser 6, the controller C may control the motor 4 to rotate in a direction in which the input gear 92 rotates in the second direction W2.

What is claimed is:

1. A sheet conveyance device comprising:

a motor;

a roller configured to convey a sheet; and a one-way clutch configured to transmit a driving force from the motor to the roller, the one-way clutch including:

a fixed shaft extending in an axial direction;

an input gear rotatably supported by the fixed shaft, the input gear being rotatable by receiving the driving force from the motor;

an output gear rotatably supported by the fixed shaft, the output gear being coupled to the roller and configured to transmit the driving force to the roller; and a transmission gear supported by the fixed shaft, the transmission gear being movable in the axial direction between a first position and a second position in a state where the transmission gear engages with the input gear, the first position being a position at which the transmission gear is separated from the output gear, the second position being a position at which the transmission gear is coupled to the output gear, the input gear being configured to:

by rotating in a first direction by receiving the driving force from the motor, move the transmission gear from the first position to the second position and transmit the driving force in the first direction to the output gear via the transmission gear; and by rotating in a second direction opposite the first direction by receiving the driving force from the motor, move the transmission gear from the second position to the first position and cancel transmission of the driving force to the output gear, the transmission gear being configured to, when the output gear rotates in a state where the transmission gear is located at the first position, not be coupled to the output gear, wherein the fixed shaft is configured to:

support the transmission gear located at the first position in a state where a first sliding resistance of a particular magnitude acts between the fixed shaft and the transmission gear; and support the transmission gear located at the second position in a state where a second sliding resistance acts between the fixed shaft and the transmission gear, the second sliding resistance being smaller than the first sliding resistance.

2. The sheet conveyance device according to claim 1, wherein, when the roller rotates in a state where the transmission gear is located at the first position, the roller is not coupled to the motor.

3. The sheet conveyance device according to claim 1, wherein the transmission gear located at the first position is configured to:

when the input gear rotates in the first direction, be moved by the input gear from the first position to the second position by keeping a state where rotation relative to the fixed shaft is suppressed due to the first sliding resistance; and wherein the transmission gear located at the second position is configured to:

when the input gear rotates in the first direction, rotate relative to the fixed shaft together with the input gear against the second sliding resistance.

4. The sheet conveyance device according to claim 1, wherein the fixed shaft includes:

a first shaft portion having a first outer diameter; and a second shaft portion having a second outer diameter smaller than the first outer diameter;

wherein the first shaft portion supports the transmission gear located at the first position in a state where the first sliding resistance acts between the first shaft portion and the transmission gear; and wherein the second shaft portion supports the transmission gear located at the second position in a state where the second sliding resistance acts between the second shaft portion and the transmission gear.

5. The sheet conveyance device according to claim 1, wherein the transmission gear is located between the input gear and the output gear in the axial direction;

wherein the input gear includes:

input teeth to which the driving force is inputted;

a transmission protrusion engageable with the transmission gear; and an inclined cam surface facing toward the output gear in the axial direction, the inclined cam surface extending along a circumferential direction, an upstream side of the inclined cam surface in the first direction being closer to the output gear in the axial direction than a downstream side of the inclined cam surface in the first direction is;

wherein the transmission gear includes:

a transmitted protrusion engageable with the transmission protrusion when the input gear rotates in the first direction;

a contact surface configured to contact the inclined cam surface when the input gear rotates in the first direction; and a ratchet pawl protruding toward the output gear in the axial direction; and wherein the output gear includes:

a ratchet recess configured to:

engage with the ratchet pawl when the transmission gear rotates in the first direction; and not engage with the ratchet pawl when the transmission gear rotates in the second direction; and output teeth coupled to the roller.

6. The sheet conveyance device according to claim 5, wherein the input gear includes:

an inclined engagement surface facing away from the output gear in the axial direction, the inclined engagement surface extending in a circumferential direction, a downstream side of the inclined engagement surface in the second direction being closer to the output gear in the axial direction than an upstream side of the inclined engagement surface in the second direction is; and wherein the transmission gear includes:

an engagement pawl configured to engage with the inclined engagement surface when the input gear rotates in the second direction.

7. The sheet conveyance device according to claim 1, further comprising a controller configured to, in response to determining that a jam of a sheet occurs, control the motor to drive in a direction in which the input gear rotates in the second direction.

8. The sheet conveyance device according to claim 1, wherein the output gear includes a body and a spacer, the spacer protruding from the body toward the input gear in the axial direction, the spacer being in contact with the input gear to regulate a position of the output gear relative to the input gear in the axial direction; and wherein the transmission gear is located between the input gear and the output gear in the axial direction, the transmission gear being movable in the axial direction between the input gear and the output gear.

9. An image forming apparatus comprising:

a print engine configured to form an image on a sheet;

a fuser configured to convey and heat the sheet conveyed from the print engine, the fuser including a roller;

a motor; and a one-way clutch configured to transmit a driving force from the motor to the roller, the one-way clutch including:

a fixed shaft extending in an axial direction;

an input gear rotatably supported by the fixed shaft, the input gear being rotatable by receiving the driving force from the motor;

an output gear rotatably supported by the fixed shaft, the output gear being coupled to the roller and configured to transmit the driving force to the roller; and a transmission gear supported by the fixed shaft, the transmission gear being movable in the axial direction between a first position and a second position in a state where the transmission gear engages with the input gear, the first position being a position at which the transmission gear is separated from the output gear, the second position being a position at which the transmission gear is coupled to the output gear, the input gear being configured to:

by rotating in a first direction by receiving the driving force from the motor, move the transmission gear from the first position to the second position and transmit the driving force in the first direction to the output gear via the transmission gear; and by rotating in a second direction opposite the first direction by receiving the driving force from the motor, move the transmission gear from the second position to the first position and cancel transmission of the driving force to the output gear, the transmission gear being configured to, when the output gear rotates in a state where the transmission gear is located at the first position, not be coupled to the output gear, wherein the fixed shaft is configured to:

support the transmission gear located at the first position in a state where a first sliding resistance of a particular magnitude acts between the fixed shaft and the transmission gear; and support the transmission gear located at the second position in a state where a second sliding resistance acts between the fixed shaft and the transmission gear, the second sliding resistance being smaller than the first sliding resistance.

10. The image forming apparatus according to claim 9, wherein the fuser includes a heater having a flat plate shape; and wherein the roller is a pressure roller configured to heat and press the sheet in cooperation with the heater.

11. The image forming apparatus according to claim 9, wherein, when the roller rotates in a state where the transmission gear is located at the first position, the roller is not coupled to the motor.

12. The image forming apparatus according to claim 9, wherein the transmission gear located at the first position is configured to:

when the input gear rotates in the first direction, be moved by the input gear from the first position to the second position by keeping a state where rotation relative to the fixed shaft is suppressed due to the first sliding resistance; and wherein the transmission gear located at the second position is configured to:

when the input gear rotates in the first direction, rotate relative to the fixed shaft together with the input gear against the second sliding resistance.

13. The image forming apparatus according to claim 9, wherein the fixed shaft includes:

a first shaft portion having a first outer diameter; and a second shaft portion having a second outer diameter smaller than the first outer diameter;

wherein the first shaft portion supports the transmission gear located at the first position in a state where the first sliding resistance acts between the first shaft portion and the transmission gear; and wherein the second shaft portion supports the transmission gear located at the second position in a state where the second sliding resistance acts between the second shaft portion and the transmission gear.

14. The image forming apparatus according to claim 9, wherein the transmission gear is located between the input gear and the output gear in the axial direction;

wherein the input gear includes:

input teeth to which the driving force is inputted;

a transmission protrusion engageable with the transmission gear; and an inclined cam surface facing toward the output gear in the axial direction, the inclined cam surface extending along a circumferential direction, an upstream side of the inclined cam surface in the first direction being closer to the output gear in the axial direction than a downstream side of the inclined cam surface in the first direction is;

wherein the transmission gear includes:

a transmitted protrusion engageable with the transmission protrusion when the input gear rotates in the first direction;

a contact surface configured to contact the inclined cam surface when the input gear rotates in the first direction; and a ratchet pawl protruding toward the output gear in the axial direction; and wherein the output gear includes:

a ratchet recess configured to:

engage with the ratchet pawl when the transmission gear rotates in the first direction; and not engage with the ratchet pawl when the transmission gear rotates in the second direction; and output teeth coupled to the roller.

15. The image forming apparatus according to claim 14, wherein the input gear includes:

an inclined engagement surface facing away from the output gear in the axial direction, the inclined engagement surface extending in a circumferential direction, a downstream side of the inclined engagement surface in the second direction being closer to the output gear in the axial direction than an upstream side of the inclined engagement surface in the second direction is; and wherein the transmission gear includes:

an engagement pawl configured to engage with the inclined engagement surface when the input gear rotates in the second direction.

16. The image forming apparatus according to claim 9, further comprising a controller configured to, in response to determining that a jam of a sheet occurs, control the motor to drive in a direction in which the input gear rotates in the second direction.

17. The image forming apparatus according to claim 9, wherein the output gear includes a body and a spacer, the spacer protruding from the body toward the input gear in the axial direction, the spacer being in contact with the input gear to regulate a position of the output gear relative to the input gear in the axial direction; and wherein the transmission gear is located between the input gear and the output gear in the axial direction, the transmission gear being movable in the axial direction between the input gear and the output gear.

18. A sheet conveyance device comprising:

a motor;

a roller configured to convey a sheet; and a one-way clutch configured to transmit a driving force from the motor to the roller, the one-way clutch including:

a fixed shaft extending in an axial direction;

an input gear rotatably supported by the fixed shaft, the input gear being rotatable by receiving the driving force from the motor;

an output gear rotatably supported by the fixed shaft, the output gear being coupled to the roller and configured to transmit the driving force to the roller; and a transmission gear supported by the fixed shaft, the transmission gear being movable in the axial direction between a first position and a second position in a state where the transmission gear engages with the input gear, the first position being a position at which the transmission gear is separated from the output gear, the second position being a position at which the transmission gear is coupled to the output gear, the input gear being configured to:

by rotating in a first direction by receiving the driving force from the motor, move the transmission gear from the first position to the second position and transmit the driving force in the first direction to the output gear via the transmission gear; and by rotating in a second direction opposite the first direction by receiving the driving force from the motor, move the transmission gear from the second position to the first position and cancel transmission of the driving force to the output gear, the transmission gear being configured to, when the output gear rotates in a state where the transmission gear is located at the first position, not be coupled to the output gear, wherein the fixed shaft includes:

a first shaft portion having a first outer diameter; and a second shaft portion having a second outer diameter smaller than the first outer diameter;

wherein the first shaft portion supports the transmission gear located at the first position; and wherein the second shaft portion supports the transmission gear located at the second position.

* * * * *